United States Patent Office 2,842,673
Patented July 8, 1958

2,842,673

NEW TYPE ELECTRONICS TUBE

George E. Sanner, Baltimore, Md., assignor, by mesne assignments, to the United States of America as represented by the Secretary of the Air Force Application January 5, 1956, Serial No. 557,616

2 Claims. (Cl. 250—83.3)

This invention relates to a new type of electronics tube, and more particularly to a tube for use in microwave circuitry. A microwave system involves the transmission of hyper-high frequency energy through a waveguide. It is often desirable to know the characteristics of the microwave energy which is being propagated within the guide.

Several methods of detecting and measuring these characteristics have been employed. For example, a resistance wire forming one arm of a bridge has been heated by the high frequency energy. The variations in resistance were measured and calculations were made therefrom. Such a resistance wire has also been used as the cathode of a diode wherein the emission current varies with wire temperature, or as a light generator in combination with a photoelectric cell, the current of which may be measured. However, none of these devices have the degree of sensitivity desired, and all are subject to numerous kinds of interference.

The tube hereinafter described operates upon the principles of gas ionization and photo electronics. Accordingly, it has been called the Ionitron.

The primary object of this invention is to provide a new type of electronics tube for use in the detection and measurement of microwave energy.

Another object of the invention is to provide a quick, accurate and inexpensive means to study the nature of such energy.

Still a further object of this invention is to make possible power level measurements which are precise even at extremely low levels and thereby give rise to a great number of new type microwave circuits.

Other objects, and a fuller understanding of the principles here involved, may be had by referring to the following description and claims, taken in conjunction with the accompanying drawings in which:

Fig. 3 is an elevation of the Ionitron as it might be coupled to a wave guide, the guide being shown in section.

It is well known that when an ionizable medium such as a gas contained within a bulb or envelope is subjected to suitable ionizing potentials, there is set up within the medium a region that contains substantially equal numbers of positive ions and electrons in addition to gas molecules. Such a gas discharge region also shows a large emission of photons or light energy quanta.

Figure 1:
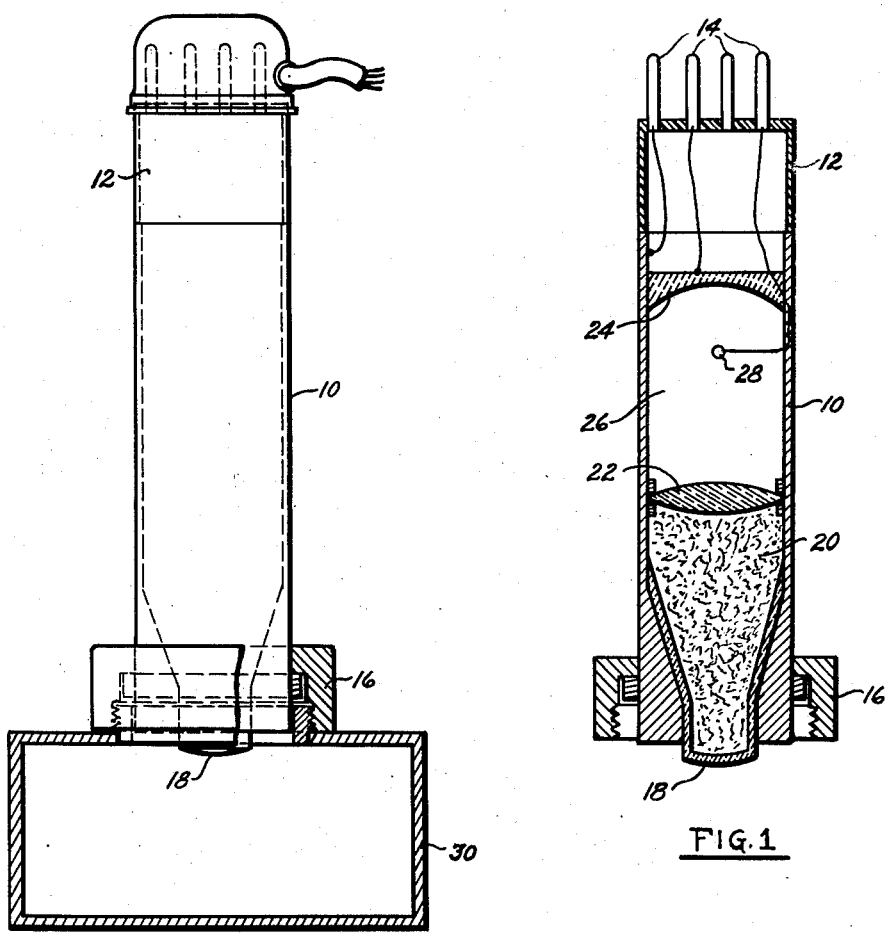
Fig. 1 is a schematic diagram of the basic type of Ionitron.

In Fig. 1 the Ionitron is seen to comprise a housing 10 and a base 12, the latter being provided with a suitable pattern of pins 14. One end of the housing carries a connecting flange 16 for attachment to some source of microwave energy. When such energy is incident on the tube from a source, it enters the interior of housing 10 through a dielectric window 18.

A chamber 20 at said end of the housing is filled with a gas which can be readily ionized when irradiated by microwave energy. This gas can be neon, argon, or any other gas having similar properties. When the energy arrives in chamber 20, light energy in the visible spectrum will be excited.

The type of gas, or concentration of gases employed, will depend upon the frequency of the energy being used. It is desirable to choose a gas which displays a very simple emission spectrum. Neon is ideal since its emission spectrum consists of several lines having wavelengths in the vicinity of 5000 A. units. The energy levels of the various gases are fully described in the literatures. In general, however, the quantum theory states that the energy level required to excite a given spectral line is quantized by Planck's equation as follows:

$$E = hV$$

where:

$E$ = quantized energy
$h$ = Planck's constant = $6.55 \times 10^{-27}$ erg.-sec.
$V$ = frequency of energy Thus it is seen that a particular gas can be chosen which will provide a simple spectrum for a given incident energy frequency.

The chamber 20 is closed at its inner end by a lens 22 inserted in housing 10. The material out of which this lens is made may be chosen to provide maximum transmission of the light energy which is emitted from the gas. The lens has a relatively short focal length, and it is placed in the tube in such a manner as to provide good focusing of the resultant light energy upon a photoelectric surface 24 located in the housing adjacent base 12. The chamber 26 formed between lens 22 and surface 24 is evacuated, or filled with a carefully chosen gas, so as to provide effective operation of the photoelectric portion of the Ionitron.

When the photosensitive surface 24 is irradiated, an electrical current is caused to flow between said surface and a collector anode 28. The photosensitive surface 24 should be designed to produce optimum operation over the particular range of light frequencies known to be emitted by the gas chosen for chamber 20. A proper choice of gas, lens and surface will provide a tube having maximum operational efficiency.

Figure 2:
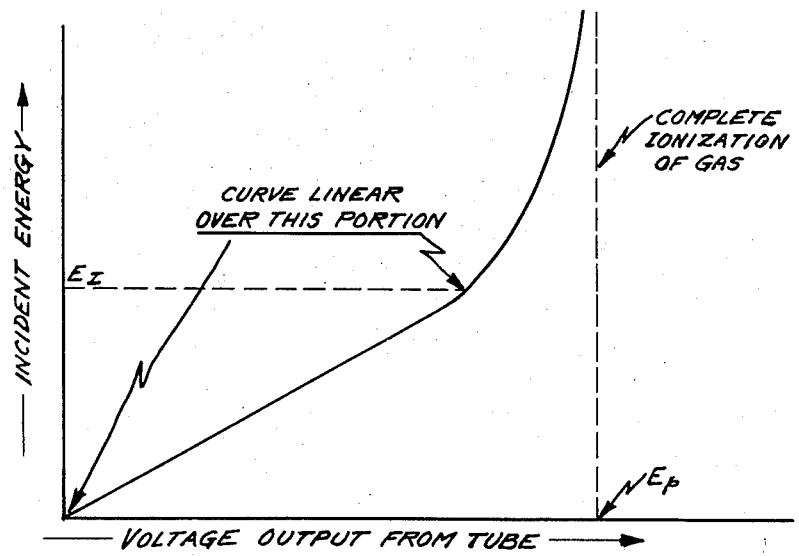
Fig. 2 is a graphic representation of tube output plotted against incident microwave energy.

Fig. 2 shows the output of the tube as plotted against the incident microwave energy. It is seen that over the lower portion of the tube characteristic curve the voltage output will vary linearly with the incident energy input. However, for values of incident energy greater than $E_I$, the output voltage will approach the value $E_p$ asymptotically. This indicates that, after the gas is emitting its maximum light energy, any further increase in incident energy will not cause any increase in light energy emission. Still, if the incident energy is increased to a very large value, a point of infinite discontinuity will occur in the characteristic curve. This will be the point at which the tube gas breaks down. Therefore, it is clear that the tube must be designed for operation over the linear portion of the curve.

The photosensitive surface 24 in Fig. 1 will be protected from excessive light energy since Lambert's law predicts self-absorption of the light energy by the ionizing gas itself. That is, if a given atom of gas causes a quantized light photon to be emitted, this photon can be absorbed by another atom of the same gas which lies between the original atom and the lens itself. Thus the distance from window 18 to lens 22 in Fig. 1 can be adjusted to provide optimum linearity of the tube characteristic curve in the vicinity of the desired power levels of the incident energy. If it were desired, for example, to operate at very high power levels, the distance would be greater than at the lower power levels. Such a construction permits a larger amount of self-absorption, and, therefore, greater protection of the photosensitive surface.

In Fig. 3 an Ionitron is shown as it might be mounted on the broadface of a rectangular waveguide 30. It must be understood that the figure merely illustrates one possible application of the tube. The Ionitron can equally well be employed in numerous different positions on any microwave component which is being energized by microwave energy.

Figure 4:
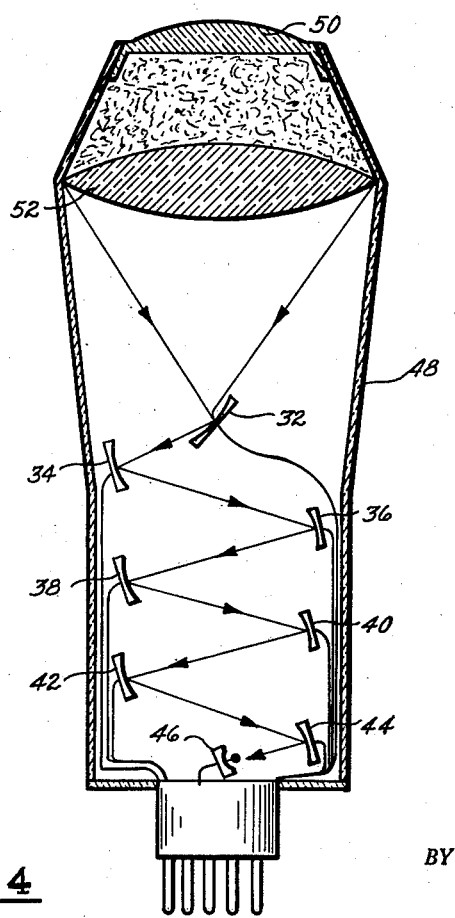
Fig. 4 schematically illustrates a modified Ionitron particularly adapted for dealing with the lowermost microwave energy levels.

The Ionitron, as described thus far, can be modified to provide a tube which is capable of superior performance in dealing with very small microwave energy levels. Such a construction is schematically shown in Fig. 4. This tube substitutes a photo-multiplier section for the single photosensitive surface 24 in Fig. 1. The section consists of a chain of photosensitive surfaces, each of which is energized in such a manner as to induce a secondary emission effect.

The several surfaces in the chain are indicated at 32, 34, 36, 38, 40, 42, 44 and 46. When light energy strikes the surface 32, there is a release of $n$ electrons. These electrons are in turn directed against the surface 34 where they cause the release of $n^2$ electrons. The latter are then propelled against surface 36 and cause the release of a proportionately larger number of electrons therefrom. This multiplying effect is continued down the chain until the final plate 46 is reached. The number of plates will obviously be chosen to give any desired high gain.

The cross-sectional area of the tube housing 48 has been increased in Fig. 4. Accordingly, the size of both the dielectric window 50 and the lens 52 has also been increased. However, the distance between the window and the lens (or the length of the ionizing gas chamber) has been proportionately reduced. While this construction provides for the same amount of gas in the chamber, it greatly decreases the degree of self-absorption. This feature permits the maximum amount of light energy to pass to the lens whereby accurate measurement of extremely low level energy is achieved.

It is to be understood that the above-described arrangements are merely illustrative of the application of the principles of the invention. Numerous other arrangements may be devised by those skilled in the art without departing from the spirit and scope of the invention.

What is claimed is:

1. An electronics tube device having a unitary, compact tube housing, a dielectric window formed in one end of said housing, a chamber containing an ionizing gas adjacent said window, a focusing means adjacent said chamber and on the opposite side thereof with respect to said window, said focusing means being mounted on said housing, and a photosensitive means in said tube for receiving light energy released upon ionization of said gas, said focusing means being positioned between the chamber and the photosensitive means.

2. An electronics tube device as defined in claim 1, in which the photosensitive means comprises a series of angularly related plates for multiplying the light energy received.

References Cited in the file of this patent

UNITED STATES PATENTS

| | | |
|---|---|---|
| 2,759,107 | Armistead | Aug. 14, 1956 |
| 2,765,411 | Kerr | Oct. 2, 1956 |
| 2,769,097 | Lord | Oct. 30, 1956 |
| 2,769,914 | Goodman | Nov. 6, 1956 |
| 2,769,918 | Tittle | Nov. 6, 1956 |